(12) United States Patent
Capps

(10) Patent No.: US 6,659,368 B2
(45) Date of Patent: Dec. 9, 2003

(54) WATER STORAGE RESERVOIR FOR AN UNDERGROUND WATERING SYSTEM

(76) Inventor: Lloyd O. Capps, 836 Mingo Ct., Claremore, OK (US) 74017

( * ) Notice: Subject to any disclaimer, the term of this patent is extended or adjusted under 35 U.S.C. 154(b) by 151 days.

(21) Appl. No.: 09/952,411

(22) Filed: Sep. 14, 2001

(65) Prior Publication Data

US 2003/0052183 A1 Mar. 20, 2003

(51) Int. Cl.⁷ ................................................ B05B 7/26
(52) U.S. Cl. ........................... 239/310; 239/17; 239/19; 239/23; 239/315; 239/316; 239/145; 239/542
(58) Field of Search ............................... 239/17, 19, 23, 239/310, 315, 316, 65, 542, 590, 590.3, 553, 533.3, 145; 47/48.5

(56) References Cited

U.S. PATENT DOCUMENTS

| | | |
|---|---|---|
| 1,175,534 A | 2/1916 | Ryan |
| 1,604,189 A | 10/1926 | Nelson |
| 1,710,362 A | 4/1929 | Korneff |
| 2,031,146 A | 2/1936 | Dodge ........................... 47/38 |
| 3,204,872 A | 9/1965 | Whear ......................... 239/63 |
| 3,407,608 A | 10/1968 | Whitehead ..................... 61/13 |
| 3,432,099 A | 3/1969 | Boniecki et al. ............... 239/18 |
| 4,065,926 A | 1/1978 | Brandt ........................... 61/13 |
| 4,268,993 A | 5/1981 | Cunningham ............... 47/48.5 |
| 4,432,291 A | 2/1984 | Shirley ......................... 111/7.1 |
| 4,527,353 A | 7/1985 | Newby .......................... 47/59 |
| 4,538,377 A | 9/1985 | Thornton ..................... 47/1 R |
| 4,545,396 A | 10/1985 | Miller et al. ............... 137/78.3 |
| 4,685,827 A | 8/1987 | Sibbel .......................... 405/37 |
| 4,720,209 A | 1/1988 | Iams ............................ 405/36 |
| 4,740,104 A | 4/1988 | Stöhr et al. ................... 405/43 |
| 4,890,955 A | 1/1990 | Mercier ........................ 405/37 |
| 5,022,585 A | 6/1991 | Burgess ........................ 239/70 |
| 5,050,343 A | 9/1991 | Henttonen ..................... 47/79 |
| 5,094,269 A | 3/1992 | Agulia ..................... 137/564.5 |
| 5,761,846 A | 6/1998 | Marz .......................... 47/48.5 |

Primary Examiner—Robin O. Evans
(74) Attorney, Agent, or Firm—Paul H. Johnson; Gable & Gotwals

(57) ABSTRACT

An underground watering system including a reservoir having a water inlet and a water outlet, a float control connected to the water inlet for maintaining a water level in the reservoir, a fertilizer container supported on the reservoir having an opening therein communicating with reservoir by which fertilizer may be added to water within the reservoir, and at least one water soaking hose connected to the reservoir water outlet.

16 Claims, 2 Drawing Sheets

WATER STORAGE RESERVOIR FOR AN UNDERGROUND WATERING SYSTEM

REFERENCE TO PENDING APPLICATIONS

This application is not related to any pending United States or international patent application.

REFERENCE TO MICROFICHE APPENDIX

This application is not referenced in any Microfiche Appendix.

BACKGROUND OF THE INVENTION

This invention relates to a water storage subterranean irrigation system.

Problems associated with the watering of lawns and gardens are well known. Most watering systems utilize sprinklers. However, sprinklers have many disadvantages which include: (1) wasting water due to evaporation; (2) mechanical breakdowns due to exposure of sprinkler heads to above ground activities such as mowing; and (3) the development of mildew on leafy portions of vegetation.

As examples of prior art relating to subterranean irrigation systems see the following United States patents:

| U.S. Pat. NO. | INVENTOR | TITLE |
| --- | --- | --- |
| 1,173,534 | Ryan | Apparatus for Irrigating and Fertilizing Soil |
| 1,604,189 | Nelson | Subirrigation System |
| 1,710,362 | Korneff | System for the Automatic Irrigation of the Soil |
| 2,031,146 | Dodge | Automatic Watering Device |
| 3,204,872 | Whear | Moisture Responsive Actuator |
| 3,407,608 | Whitehead | Subsurface Irrigation System |
| 3,432,099 | Boniecki et al | Figure Having an Associated Spray of Liquid Simulating Wearing Apparel |
| 4,065,926 | Brandt | Subterranean Irrigation System |
| 4,268,993 | Cunningham | Grass Sports Surfaces and a Method for Maintaining Them |
| 4,432,291 | Shirley | Underground Irrigator |
| 4,527,353 | Newby | Irrigation/Fertilization Control and Distribution System |
| 4,538,377 | Thornton | Irrigation System |
| 4,545,396 | Miller et al. | System for Optimum Irrigation and Fertilizing |
| 4,685,827 | Sibbel | Watering System |
| 4,720,209 | Iams | Drywell Structure |
| 4,740,104 | Stohr et al. | Underground Irrigation or Watering of Soil |
| 4,890,955 | Mercier | Control Device for Underground Drainage Network |
| 5,022,585 | Burgess | Automatic Chemigation |
| 5,050,343 | Henttonen | Method and Apparatus for Artificial Irrigation of Plants |
| 5,094,269 | Agulia | Liquid Fertilizer Metering System |
| 5,761,846 | Marz | Underground Irrigation Device |

BRIEF SUMMARY OF THE INVENTION

The underground water system of this disclosure includes an above ground reservoir housing having a closed top, a water inlet and a water outlet. A float control connected to the water inlet maintains a water level in the reservoir housing. An open top fertilizer dispenser container is supported on the reservoir housing top and has an opening in the bottom that communicates with the interior of the reservoir housing by which fertilizer is added to the water within the reservoir housing. In a preferred embodiment, a birdbath container is supported on top of the reservoir housing with the fertilizer dispenser container positioned on top of the birdbath. In a further preferred arrangement, a tube is attached at a first end to the float control and extends through the reservoir housing top to a position above the birdbath so that when the float control is actuated to add more water to the reservoir, water is passed through the hose and squirts into the birdbath. The birdbath has overflow openings that communicate with the interior of the reservoir housing so that the water flows into the reservoir housing to maintain the fluid level in it. The underground watering system thus provides a birdbath and simultaneously a method of providing constant water delivery to soaker hoses.

The open top fertilizer dispenser container that is positioned within and above the birdbath container preferably is of ornamental design such as a duck, swan or so forth. The open top permits easy addition of fertilizer which may be either liquid or granular fertilizer. When granular fertilizer is deposited in the open top fertilizer dispenser then water can be periodically added to dissolve the fertilizer and the dissolved fertilizer then flows downwardly to mix with the water in the reservoir housing.

Thus, this invention provides a system including a reservoir that supports a birdbath in which water in the birdbath is periodically refreshed; in which water is continuously administered to soaker hoses; and in which fertilizer can easily be added to the water passing through the soaker hoses for improved plant growth.

A more complete understanding of the invention will be obtained by reference to the following detailed description of the preferred embodiment and the claims, taken in conjunction with the attached drawings.

DETAILED DESCRIPTION OF A PREFERRED EMBODIMENT

This invention provides a reservoir storage tank connected to supply irrigation water to a series of subterranean water soaker hoses. The application of irrigation water underground overcomes many of the disadvantages of conventional sprinkler systems since water due to evaporation is minimized or eliminated. Furthermore, since a vegetation root system grows towards a water source, roots tend to be deeper when irrigation water is delivered underground, as contrasted with a conventional sprinkler system that applies irrigation water onto the ground surface causing shallow root systems.

Figure 1:
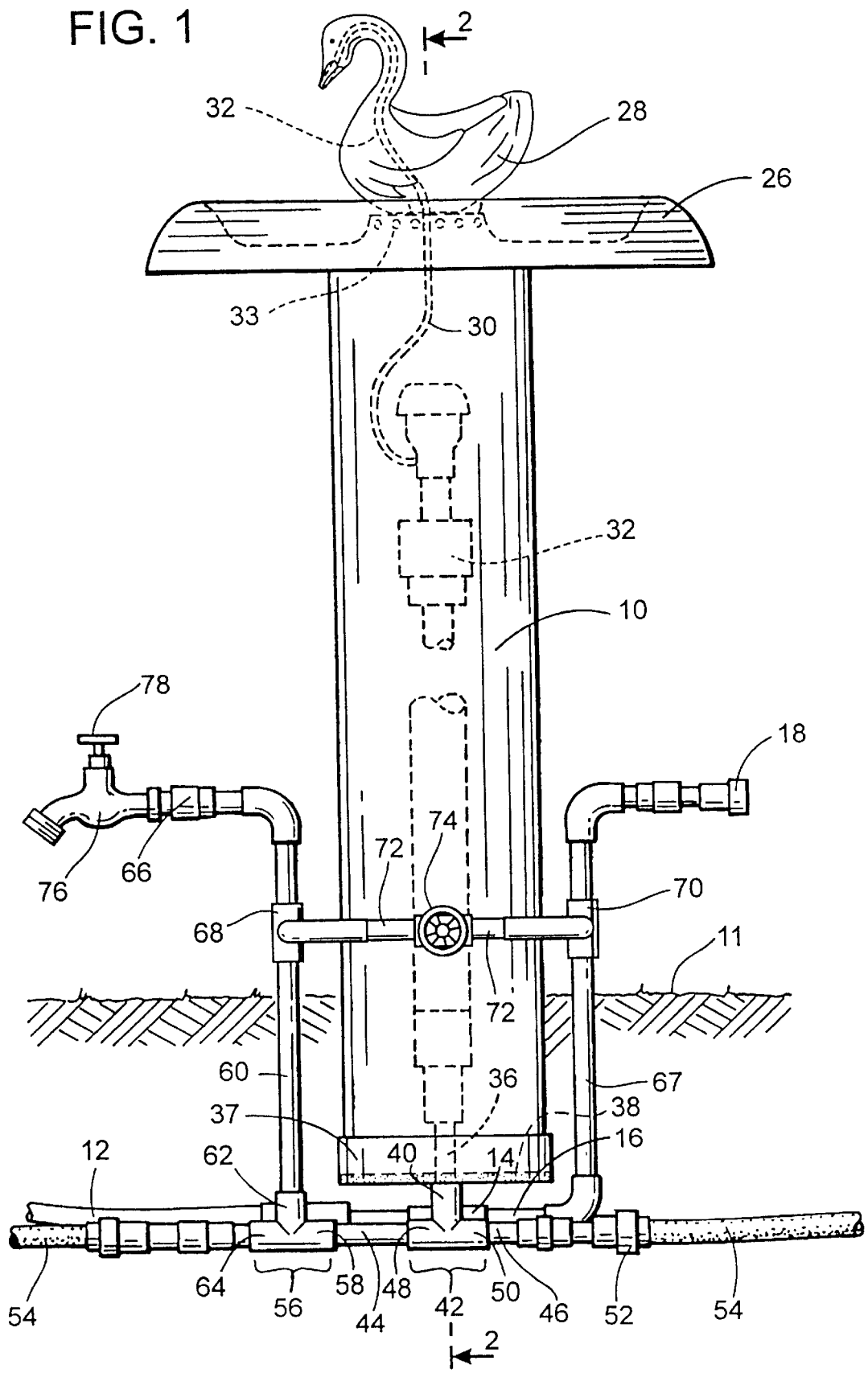
FIG. 1 is an elevational side view of storage reservoir of an underground watering system of this invention including relevant piping.
Figure 2:
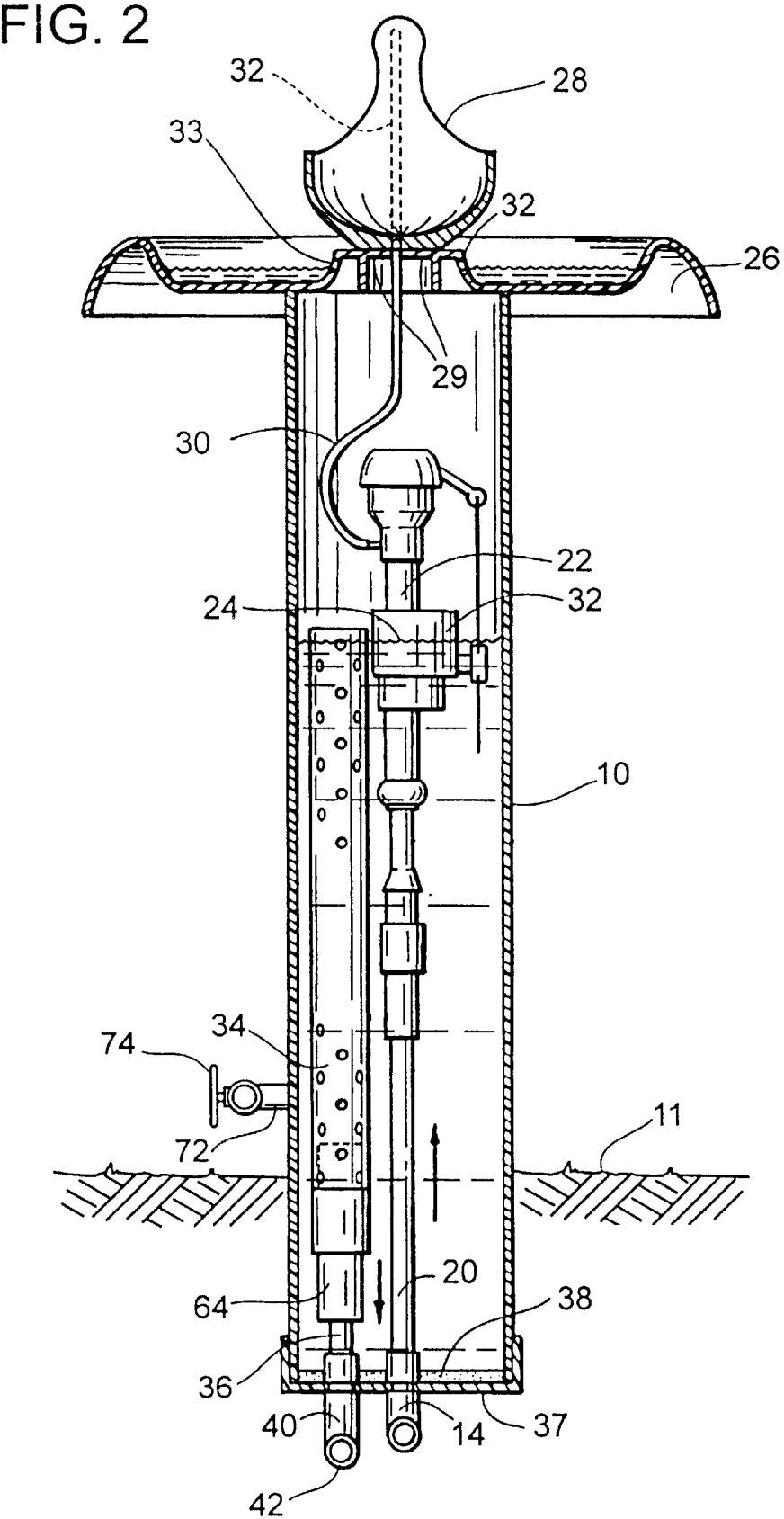
FIG. 2 is an elevational cross-sectional view taken along the line 2—2 of FIG. 1.

FIGS. 1 and 2 illustrate a preferred embodiment of the underground watering system of this invention. FIG. 1 shows an upright reservoir housing 10 within which irrigation water is stored. Normally, the base or bottom of the reservoir housing 10 is buried below ground surface 11 to a sufficient depth to support the housing in an upright orientation.

A water supply inlet pipe 12 is connected to a first end of a first T-coupling 14 located under the reservoir housing 10. A second water supply inlet pipe 16 is connected to the second end of the first T-coupling 14. The second water inlet pipe 16 can be buried like the first water inlet pipe 12 or it can, as illustrated, extend upward along the side of the reservoir housing 10. When water demand is particularly heavy, a surface hose can be run from an additional water source and connect to a female coupling 18. When an additional water inlet hose is not required a plug can be attached to female coupling 18 to prevent water from escaping.

FIG. 2 best illustrates the interior of reservoir housing 10. A vertical water inlet pipe 20 is connected to the third end of the first T-coupling 14. A float mechanism 22 controls the water level within reservoir housing 10 and is attached to the upper end of vertical water inlet pipe 20. A Fluidmaster® Model 400A float mechanism is an example of a commercially available device for controlling the water level 24 within reservoir housing 10.

A birdbath container 26 provides a top for reservoir housing 10. Attached to the top center of birdbath 26 is a decorative open top fertilizer container 28 which, as illustrated, is an open top swan-shaped container. Fertilizer container 28 has a hollow interior for the addition of fertilizer. Drain holes 29 in container 28 extend through birdbath 26 into communication with the interior of reservoir housing 10 allowing fertilizer to drain into water within the reservoir housing. Fertilizer container 28 in FIG. 1 is attached to birdbath 26 with a sealant and a bolt with a large washer (not shown).

A small plastic hose 30 is attached at one end to float mechanism 22 and passes through the birdbath 26 and through decorative fertilizer container 28. When float 32 attached to float mechanism 22 drops below a particular position, water is turned on to refill the reservoir housing 10. All or part of the incoming water is diverted through small plastic hose 30 and through decorative fertilizer container 28 and into birdbath 26. When birdbath 26 fills, excess water is drained through drain holes 33 to replenish water in reservoir housing 10. When the water level 24 rises sufficiently, float 32 activates mechanism 22 to turn off water flow.

Located adjacent and parallel to float mechanism 22 is a water outlet piping system having a water filter 34 attached to the upper end of a water outlet pipe 36. The lower end of water outlet pipe 36 extends through the base 37 of reservoir housing 10 and is attached to the third end 40 of the second T-coupling 42. After the fitting has been extended through openings in the bottom of base 37, a layer of sealant 38 is poured into reservoir housing 10 to set up around the fitting and thereby prevent leakage of reservoir water through the base.

Second T-coupling 42 acts as a manifold for the distribution of the irrigation water. Extension pipes 44 and 46 are attached to the first and second ends 48, 50 of second T-coupling 42.

Attached to an end of extension pipe 46 is a coupling 52 for the attachment of a soaker hose 54. A third T-coupling 56 is attached at a first end 58 to an end of extension pipe 44. A vertical pipe 60 is attached to a second end 62 of third T-coupling 56. A soaker hose 54 is attached to a third end 64 of third T-coupling 56.

Vertical pipe 60 extends above ground surface 11 and has a coupling 66 allowing for a hose connection. Coupling 66 has two functions. First, during periods of drought, coupling 66 allows for the attachment of a water hose which can boost the amount of water being supplied to the soaker hoses. Second, coupling 66 allows the soaker hoses to be "blown out". Prior experience has shown that over a period of time soil particles clog soaker hoses, decreasing the efficiency of the soaker hoses. By directing water under pressure directly into soaker hoses 54, an operator can periodically "flush out" the soaker hoses to improve the irrigation process.

When water under pressure is used to blow out soaker hoses 54 it is important that the water not be permitted to flow backwards into the interior of reservoir housing 10 since reservoir housing would soon fill and overflow. Therefore, a check valve 64 is positioned below water filter 34 and between the water filter and the third end 40 of second T-coupling 42. Check valve 64 allows water to freely flow from within the reservoir into second T-coupling 42 and thence out through soaker hoses 54 but prevents water from flowing into reservoir housing 10 if pressure is applied by way of coupling 66 and vertical extension 60.

As has been previously described, water inlet supply pipe 12 is connected through first T-coupling 14 to a second inlet water supply pipe 16 that has a vertically extending portion 67. A T-fitting 68 is placed in vertical extension pipe 60 and in like manner a T-fitting 70 is placed in vertical extension pipe 67. Piping 72 interconnects T-fitting 68 and 70 and has, interposed within piping 72 a manually operable shut-off valve 74. Normally, valve 74 is closed, however when a source of water pressure is connected either to the female coupling 18 or to coupling 66, valve 74 can be opened so that this source of water pressure is applied to the either of pipes 60 or 67. For instance, if a source of water pressure is attached to female coupling 18 and valve 74 is open, this water pressure is applied by way of piping 72, T-fitting 68 and an upper extension of vertical pipe 60 to coupling 66. As illustrated in FIG. 1, there is attached to coupling 66 a bibcock 76 that can receive the attachment of a garden hose. Flow through the bibcock is controlled by a handle 78.

The basic system of the invention works in this way. Water pressure is supplied by way of water inlet pipe 12. Water flows through first T-coupling 14 and upwardly through vertical water inlet pipe 20 within the reservoir housing 10. Water pressure is applied to float mechanism 22 causing water to flow directly into the reservoir or all or a portion of the water can be arranged to flow through plastic hose 30 that extends upwardly through birdbath 26 and through the bottom of open top fertilizer container 28. In a preferred arrangement, plastic hose 30 extends so as to discharge water into birdbath 26 in an aesthetic way, such as through the beak of the swan-shaped fertilizer container 28. After the water level in the birdbath reaches drain holes 29, the water flows through the drain holes into the interior of reservoir housing 10. Water level 24 will rise in reservoir housing until float 32 actuates float control mechanism 22 to shut off further water flow.

Thus a water level 24 is maintained within housing 10 and at the same time water is maintained within birdbath 26.

Water within housing 10 flows by way of filter 34 and check valve 64 into second T-coupling 42 and from the T-coupling to soaker hoses 54. As water flows out the soaker hoses the water level 24 drops and the process is repeated, channeling water by way of plastic hose 30 into the birdbath and back into the reservoir housing. Thus a constant supply of water is supplied to the soaker hoses 54 and the water is only under the pressure of gravity so that a consistent flow rate is maintained.

When a user wishes to add fertilizer to the water passing out through soaker hoses 54 he/she places the fertilizer in open top fertilizer container 28. Either liquid or solid granulated fertilizer may be used. If solid granulated fertilizer is placed into container 28 then water may then be also placed to dissolve the granulated fertilizer. Either the liquid fertilizer or fertilizer dissolved from granulated fertilizer passes by way of drain holes 29 directly from within the open top fertilizer container 28 to the interior of reservoir housing 10. Drainage of fertilizer out of fertilizer container 28 enters into birdbath 26 but only directly into the interior of reservoir housing 10.

Thus the unique underground watering system as illustrated and described herein provides a way of supplying water under gravity, as contrasted with pump pressure or normal city water supply pressure to soaker hoses in a continuous manner while maintaining water always within a birdbath. Further, the system provides for adding fertilizer to the water being distributed through soaker hoses—all in a highly decorative system.

The system of this invention can be used to reduce foundation damage of a home or small commercial building in which the soil on which the building sits in subject to contraction in times of dry weather. With a soaker hose 54 buried about eight to ten inches deep adjacent a foundation wall moisture is provided to keep the soil around the foundation from drying out. When a ditch adjacent a foundation is dug it is helpful to spread about three inches of peat moss over the soaker hose before refilling the ditch. The peat moss ensures better distribution of water from the soaker hose. When the system is used to protect a foundation bird bath 26 and container 28 may be deleted, or container 28 can be used to receive, rather than fertilizer, a chemical to discourage termites or other insects.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. An underground watering system comprising:
   a reservoir housing having a top, a water inlet and a water outlet;
   a float control connected to said water inlet for maintaining a water level in said reservoir housing;
   a fertilizer container supported on said reservoir housing top having at least one opening therein communicating with said reservoir housing by which fertilizer may be added to water within said reservoir housing; and
   at least one water soaking hose connected to said reservoir housing water outlet.

2. An underground watering system according to claim 1 wherein said reservoir housing is an upright cylinder.

3. An underground watering system according to claim 1 including a filter located within said reservoir housing and connected to said water outlet.

4. An underground watering system according to claim 1 wherein a check valve is connected to said water outlet to prevent water flowing into said reservoir housing through said water outlet.

5. An underground watering system according to claim 1 including a birdbath supported to an upper portion of said reservoir housing and positioned below said fertilizer container.

6. An underground watering system according to claim 5 wherein said birdbath forms said reservoir housing top.

7. An underground watering system according to claim 5 wherein a second hose is attached at a first end to said float control and a second end extends through said reservoir housing and a bottom portion of said birdbath, the second hose delivering water into said birdbath.

8. An underground watering system according to claim 7 wherein said birdbath has at least one overflow opening that communicates with said reservoir housing allowing water from said birdbath to drain into said reservoir housing.

9. An underground watering system according to claim 7 wherein said fertilizer container is decorative and wherein said second hose second end is attached to said fertilized container whereby water flowing through said second hose emanates from said fertilizer container.

10. A water storage reservoir for an underground watering system, comprising;
    a reservoir housing having a top and bottom portion;
    a water inlet extending into said reservoir housing;
    a float control for controlling a level of water in said reservoir housing and connected to said water inlet;
    a water outlet extending from said reservoir housing;
    at least one water soaker hose connected to said water outlet; and
    a fertilizer container supported on said reservoir housing top portion and having at least one opening communicating with said reservoir housing by which fertilizer may be added to water within said reservoir housing.

11. A water storage reservoir according to claim 10 including a birdbath supported to said reservoir housing top portion and below said fertilizer dispenser container.

12. A water storage reservoir according to claim 10 wherein said reservoir housing is an upright cylinder.

13. A water storage reservoir according to claim 10 wherein a check valve is connected to said water outlet to prevent water flowing into said reservoir housing through said water outlet.

14. An underground watering system according to claim 11 wherein a second hose is attached at a first end to said float control and a second end extends through said reservoir housing top portion and into said birdbath, the second hose delivering water into said birdbath.

15. An underground watering system according to claim 14 wherein said fertilizer dispenser is decorative and wherein said second hose second end is attached to said fertilizer container whereby water flowing through said second hose emanates from said fertilizer container.

16. An underground watering system, according to claim 14 wherein said birdbath has at least one overflow opening that communicates with said reservoir housing allowing water to flow from said birdbath into said reservoir housing.

* * * * *